US010430437B2

(12) United States Patent
Purushothaman et al.

(10) Patent No.: US 10,430,437 B2
(45) Date of Patent: Oct. 1, 2019

(54) AUTOMATED ARCHIVAL PARTITIONING AND SYNCHRONIZATION ON HETEROGENEOUS DATA SYSTEMS

(71) Applicant: BANK OF AMERICA CORPORATION, Charlotte, NC (US)

(72) Inventors: Venugopal Purushothaman, TamilNadu (IN); Chandan Yadu Varaha Vedagiri, Pradesh (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 291 days.

(21) Appl. No.: 15/427,526

(22) Filed: Feb. 8, 2017

(65) Prior Publication Data

US 2018/0225352 A1 Aug. 9, 2018

(51) Int. Cl.
*G06F 17/30* (2006.01)
*G06F 16/27* (2019.01)
*G06F 16/21* (2019.01)
*H04L 29/08* (2006.01)
*H04L 12/24* (2006.01)

(52) U.S. Cl.
CPC .......... *G06F 16/278* (2019.01); *G06F 16/214* (2019.01); *G06F 16/275* (2019.01); *H04L 41/0856* (2013.01); *H04L 41/0873* (2013.01); *H04L 67/1095* (2013.01)

(58) Field of Classification Search
CPC ...................................................... G06F 17/30
USPC ........................................................ 707/634
See application file for complete search history.

(56) References Cited

U.S. PATENT DOCUMENTS

| 5,726,979 | A | * | 3/1998 | Henderson | ............ | H04J 3/0688 370/254 |
| 5,926,816 | A | | 7/1999 | Bauer et al. | | |
| 5,987,478 | A | | 11/1999 | See et al. | | |
| 6,045,603 | A | | 4/2000 | Chen et al. | | |
| 6,232,967 | B1 | | 5/2001 | Kelley et al. | | |
| 6,236,993 | B1 | | 5/2001 | Fanberg | | |

(Continued)

OTHER PUBLICATIONS

Fundamentals of Database Systems, Third Edition, Ramez Elmasri and Shamkant B. Navathe, Copyright 200, Chapter 5, pp. 113-154 and Chapter 14, pp. 465-497.

(Continued)

*Primary Examiner* — Kim T Nguyen
(74) *Attorney, Agent, or Firm* — Michael A. Springs; Moore & Van Allen PLLC; Nicholas C. Russell

(57) ABSTRACT

Disclosed is a system for automated archival and synchronization that includes a processor and a memory, wherein archival, partition, and synchronization applications are stored in the memory. The system is typically configured for: identifying triggering of an event and establishing a communication link between a source system and a destination system, determining that the event meets archival criteria and initiating archival process, wherein the archival process comprises determining that a first configuration of the source system does not match the second configuration of the destination system and synchronizing the second configuration with the first configuration, migrating a first set of data from the source system to update a second set of data in the destination system based on determining a change in the first set of data, and compressing the updated second set of data in the destination system.

18 Claims, 6 Drawing Sheets

(56) References Cited

U.S. PATENT DOCUMENTS

| | | |
|---|---|---|
| 6,584,477 B1 | 6/2003 | Mosher, Jr. |
| 7,379,978 B2 | 5/2008 | Anderson et al. |
| 7,403,942 B1 | 7/2008 | Bayliss |
| 7,406,499 B2 * | 7/2008 | Singh .................. G06F 16/27 709/205 |
| 7,555,705 B2 | 6/2009 | Chen et al. |
| 7,725,439 B2 | 5/2010 | Doney |
| 7,730,054 B1 | 6/2010 | Marmaros et al. |
| 8,005,823 B1 | 8/2011 | Marshall et al. |
| 8,260,813 B2 | 9/2012 | Coldicott et al. |
| 8,452,755 B1 * | 5/2013 | Ye ........................ G06F 16/38 707/715 |
| 8,819,042 B2 | 8/2014 | Samudrala et al. |
| 8,984,003 B2 | 3/2015 | Ahmed et al. |
| 9,020,976 B2 | 4/2015 | Ahmed et al. |
| 9,350,668 B2 * | 5/2016 | Diaz ..................... H04L 45/741 |
| 10,162,873 B2 * | 12/2018 | Bonzini ............... G06F 16/273 |
| 10,210,232 B2 * | 2/2019 | Richman .............. G06F 16/27 |
| 10,216,744 B2 * | 2/2019 | Yap ...................... G06F 16/119 |
| 10,241,814 B2 * | 3/2019 | Tsirkin ................ G06F 9/45558 |
| 10,270,852 B2 * | 4/2019 | Hirose ................ H04L 67/1095 |
| 2002/0087588 A1 | 7/2002 | McBride et al. |
| 2005/0171936 A1 | 8/2005 | Zhu |
| 2006/0004528 A1 | 1/2006 | Uehara et al. |
| 2006/0212465 A1 | 9/2006 | Fish et al. |
| 2006/0222160 A1 | 10/2006 | Bank et al. |
| 2007/0083541 A1 | 4/2007 | Fraleigh et al. |
| 2008/0195374 A1 | 8/2008 | Holubar et al. |
| 2008/0208855 A1 | 8/2008 | Lingenfelder et al. |
| 2008/0313204 A1 | 12/2008 | Schultz et al. |
| 2009/0323910 A1 | 12/2009 | Sharma |
| 2010/0070377 A1 | 3/2010 | Williams et al. |
| 2010/0100529 A1 | 4/2010 | Erofeev |
| 2010/0131526 A1 | 5/2010 | Sun et al. |

OTHER PUBLICATIONS

International Search Report for PCT/US11/33012 dated Jul. 1, 2011.

* cited by examiner

500

| Data System 1 | Data System 2 | Data System 3 | Data System 4 |
|---|---|---|---|
| Datatype 1A | Datatype 2A | Datatype 3A | Datatype 4A |
| Datatype 1B | Datatype 2B | Datatype 3B | Datatype 4B |
| Datatype 1C | Datatype 2C | Datatype 3C | Datatype 4C |
| Datatype 1D | Datatype 2D | Datatype 3D | Datatype 4D |
| Datatype 1E | Datatype 2E | Datatype 3E | Datatype 4E |
| Datatype 1F | Datatype 2F | Datatype 3F | Datatype 4F |
| Datatype 1G | Datatype 2G | Datatype 3G | Datatype 4G |

*FIG. 5*

AUTOMATED ARCHIVAL PARTITIONING AND SYNCHRONIZATION ON HETEROGENEOUS DATA SYSTEMS

FIELD OF THE INVENTION

The present invention provides systems, methods, and computer program products for automated archival and synchronization between source and destination data systems.

BACKGROUND

Archival of inconsistent and huge data can be a challenging process. In addition, it can be challenging to archive the data in data systems, wherein the data systems have a dynamically changing design. Thus, there exists a need for an improved system for performing an archival process on dynamically changing data systems.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above problem by providing apparatuses (e.g., a system, a computer program product comprising computer program code stored on a non-transitory computer-readable medium which is readable by a computer, and/or other devices) and computer implemented methods for automated archiving, partitioning, and synchronizing heterogeneous data systems, the system comprising a computer apparatus including a processor and a memory; and an automated archival partitioning and synchronization application stored in the memory, comprising executable instructions that when executed by the processor cause the processor to identify triggering of an event, wherein the event comprises performance degradation of a source system below a defined value; establish a communication link with the source system and a destination system based on identifying the triggering of the event; determine that the event meets archival criteria and initiate archival process, wherein the archival process comprises comparing a first configuration of the source system with a second configuration of the destination system and determining that the first configuration does not match the second configuration; synchronizing the second configuration with the first configuration based on determining that the first configuration does not match the second configuration; identifying a change in a first set of data stored in the source system based on comparing the first set of data with a second set of data stored in the destination system; migrating the first set of data from the source system to update the second set of data in the destination system; determine that the migration of the first set of data to the destination system is successful and truncate the communication link; and compress the updated second set of data in the destination system and update indexes associated with the destination system.

In some embodiments, the archival process further comprises partitioning and sub-partitioning of the first set of data stored in the source system, wherein the partitioning and sub-partitioning of the first set of data is based on a set of rules.

In some embodiments, synchronizing the first configuration with the second configuration comprises mapping datatypes of the source system and the destination system.

In some embodiments, the communication link between the source system and destination system is established based on receiving a command at least from one of a job scheduler or a manual run.

In some embodiments, the archival process further comprises comparing a first configuration of the source system with a second configuration of the destination system and determining that the first configuration matches the second configuration; identifying a change in a first set of data stored in the source system based on comparing the first set of data with a second set of data stored in the destination system; and migrating the first set of data from the source system to update the second set of data in the destination system.

In some embodiments, the determining that the migration of the first set of data to the destination system is successful further comprises creating a record in a log system.

In some embodiments, the source system and the destination system are heterogeneous systems or homogeneous systems.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
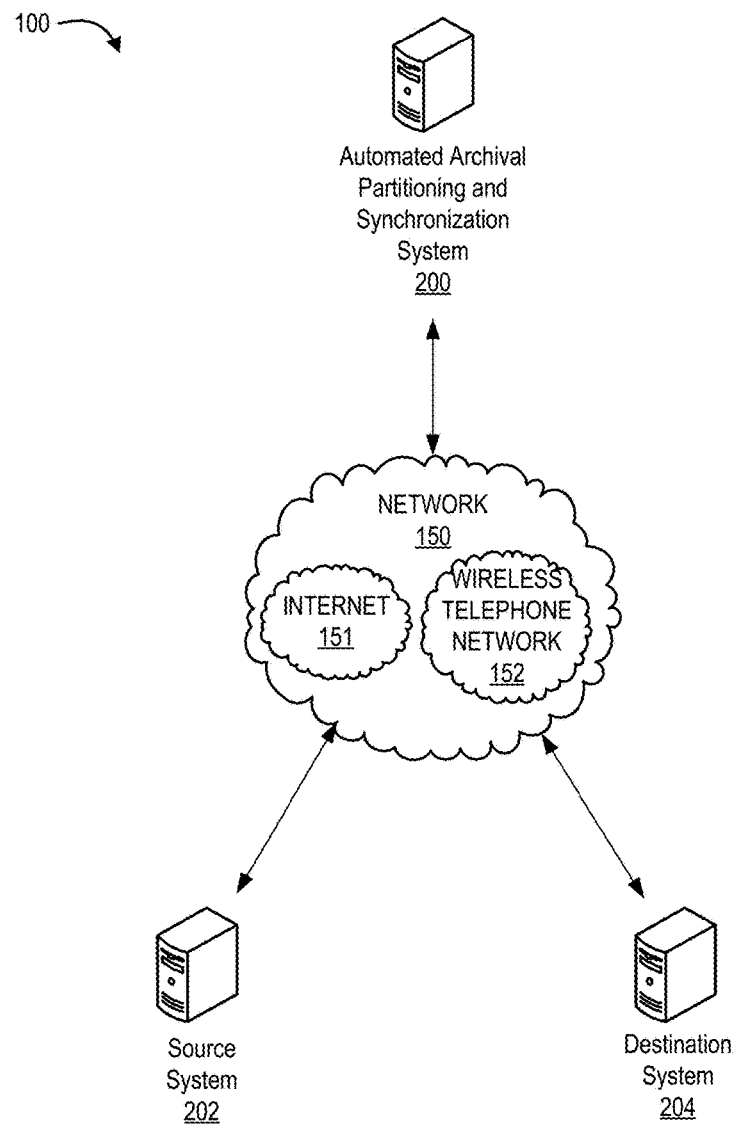
Figure 2:
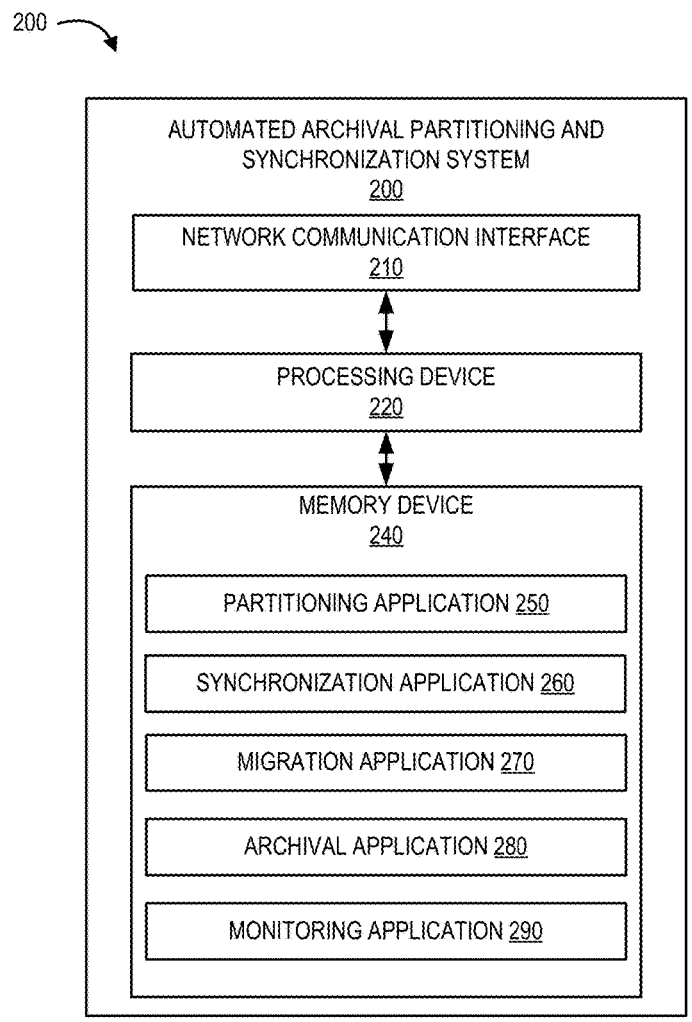
Figure 3A:
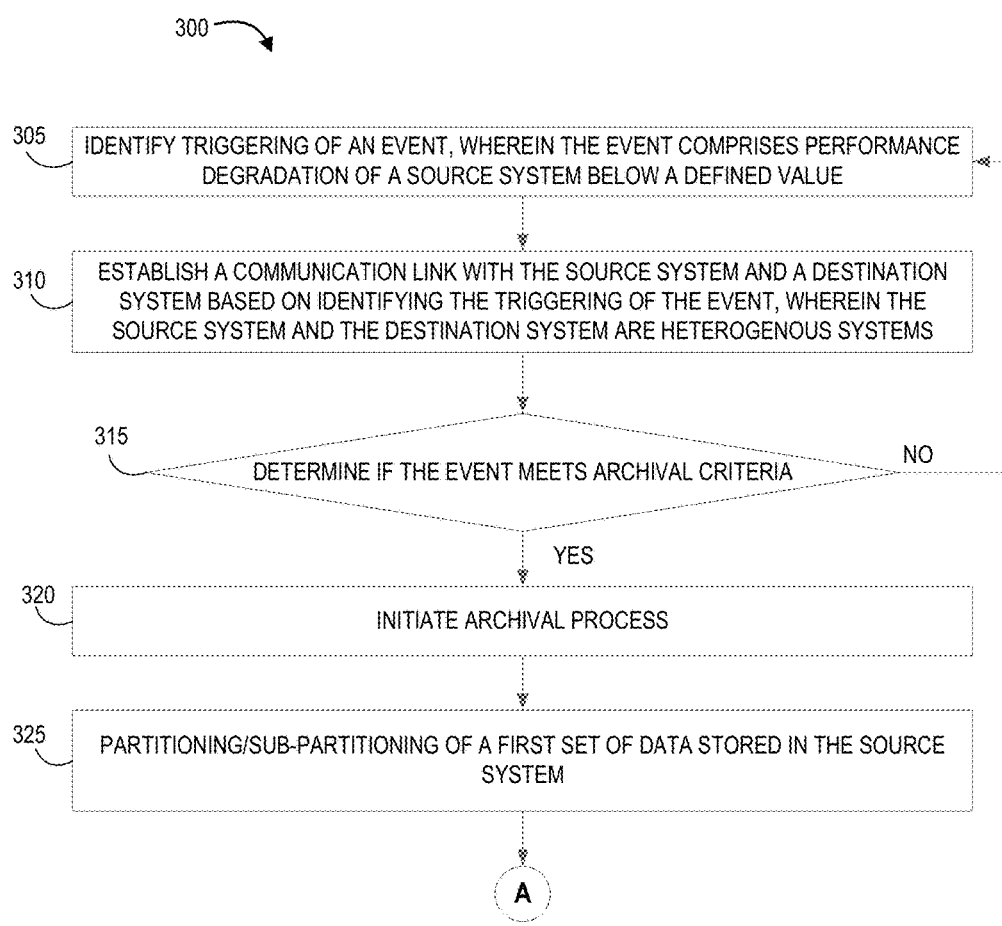
Figure 3B:
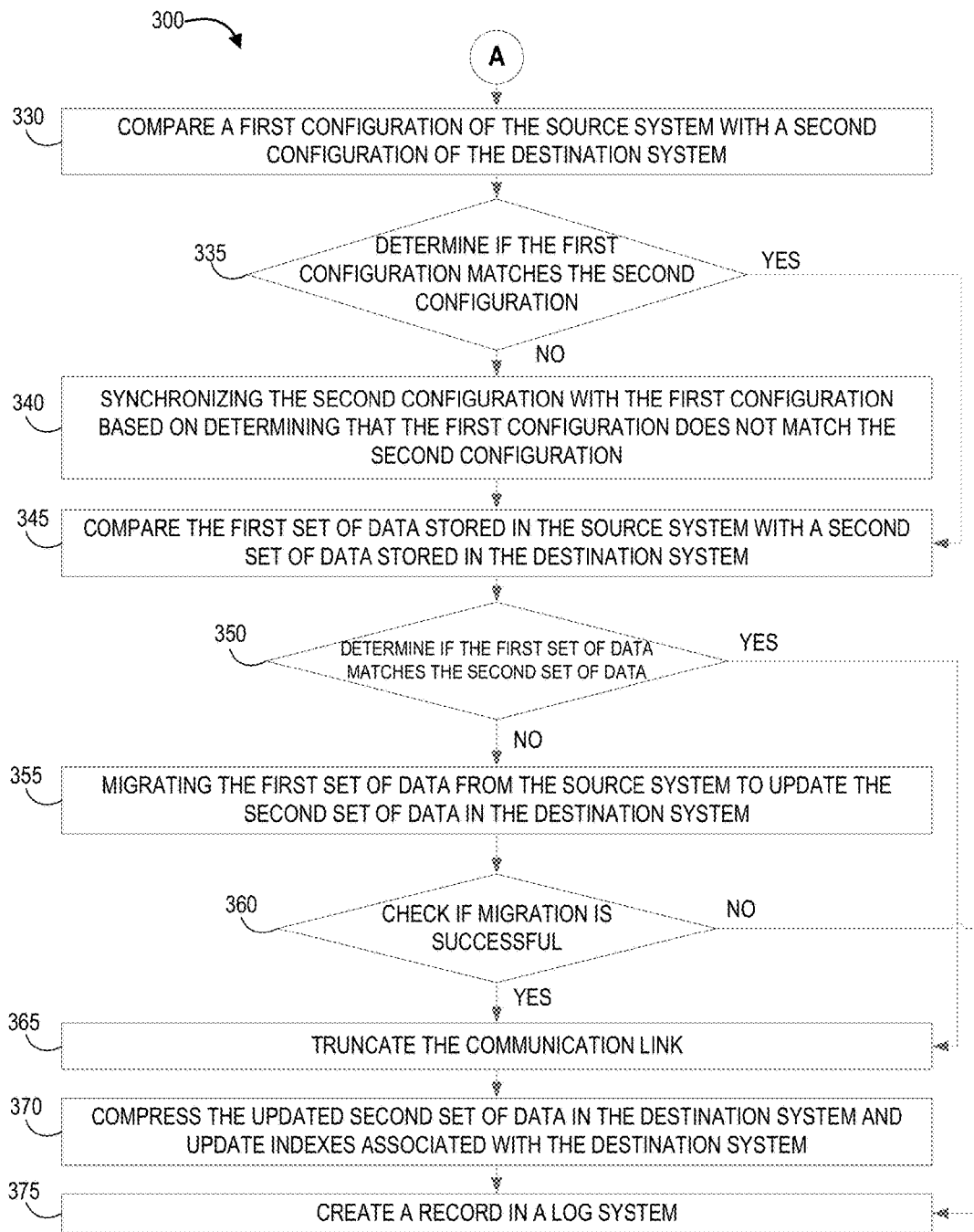
Figure 4:
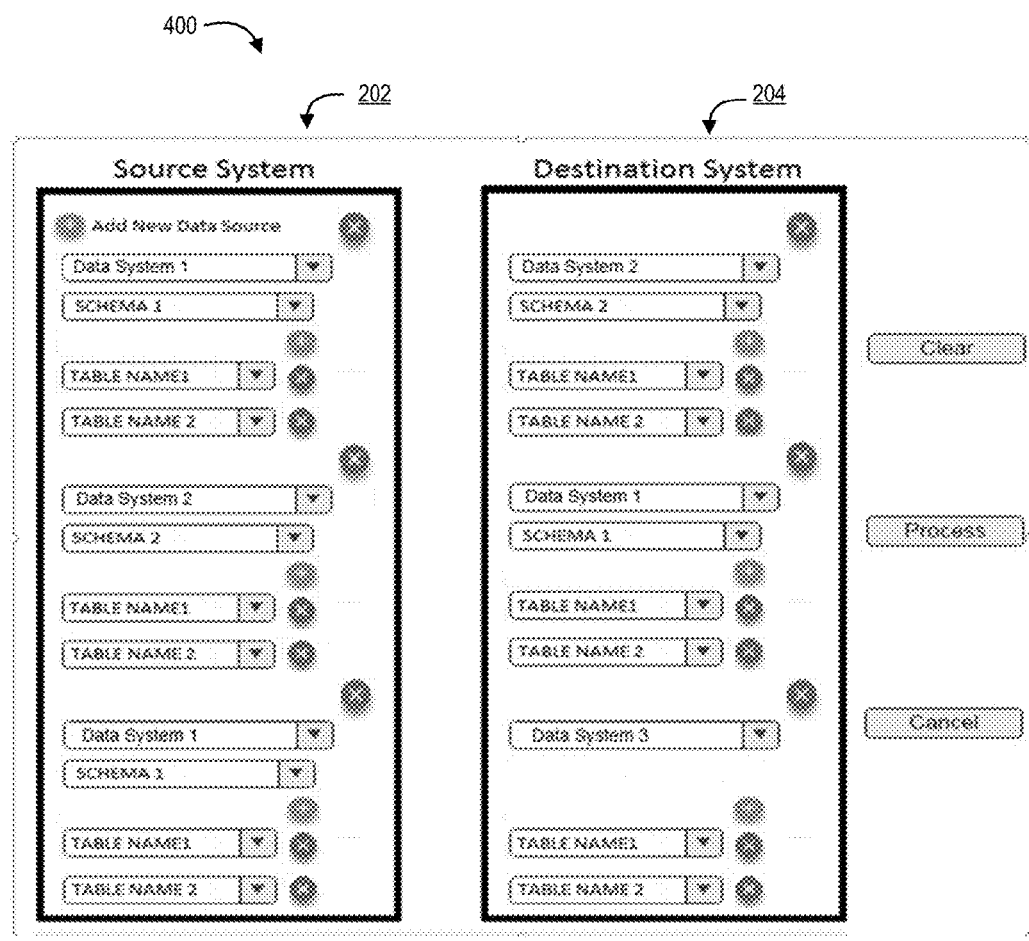

Having thus described embodiments of the invention in general terms, reference will now be made to the accompanying drawings, wherein:

FIG. 1 presents a system environment in which embodiments of the invention operate, in accordance with one embodiment of the present invention;

FIG. 2 presents a block diagram illustrating the automated archival partitioning and synchronization system illustrated in FIG. 1, in accordance with embodiments of the present invention;

FIG. 3A and FIG. 3B presents a process flow for archiving, partitioning, and synchronizing heterogeneous data systems, in accordance with embodiments of the present invention;

FIG. 4 presents a user interface for archival partitioning and synchronizing system, in accordance with embodiments of the present invention; and FIG. 5 presents a configuration mapping table for synchronizing heterogeneous data systems, in accordance with embodiments of the present invention.

DETAILED DESCRIPTION OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Embodiments of the present invention are directed to archiving, partitioning, and synchronizing heterogeneous data systems. Many of the embodiments and example implementations thereof described herein are directed towards solving a technical problem of handling inconsistent and huge data on heterogeneous data systems, wherein the data systems have a dynamic nature. Present systems require third party tools and other migration systems to accomplish the task of archival, partitioning, and synchronization. The other migration systems and third party tools require human input and change of configuration for dynamically changing environment. Addition of other third party tools and migration systems which require human intervention in every step of the process, slow down the process itself and also increase the risk of human errors because of inconsistent and huge data.

To solve these technical issues, the present invention embraces an automated archival and synchronization system that eliminates the need to use third party tools and migration systems. The automated archival and synchronization system is a unified system which is used to perform migration of data, archival, partitioning, and synchronization on disparate data systems without the need for constant human input to configure the system based on dynamically changing environment.

Referring now to FIG. 1, the figure illustrates a processing system environment 100, in accordance with some embodiments of the invention. The environment 100 includes an automated archival partitioning and synchronization system 200, source system 202, and destination system 204. In some embodiments, the environment 100 may include multiple source systems and multiple destination systems. In some embodiments, the environment 100 may include multiple source systems and a single destination system. In some other embodiments, the environment 100 may include a single source system and multiple destination systems. In some embodiments, the automated archival partitioning and synchronization system 200, source system 202, destination system 204 may be a part of a single system. In alternate embodiments, the automated archival partitioning and synchronization system 200, source system 202, destination system 204 are autonomous systems. In some embodiments, the environment 100 may include a monitoring system (not shown). For example, the monitoring system may include a log system which may be used to create a log with records of multiple data migrations and/or other activities. In some embodiments, the destination system is an archival system. In some other embodiments, the source system and the destination system are archival systems. In some embodiments, the source system 202 and destination system 204 may be two geographically separated systems. In some embodiments, the source system 202 and destination system 204 may be two different systems having same properties. For example, both the source system 202 and the destination system 204 may be Oracle database systems.

In some embodiments, the source system 202 may be a database system. In some embodiments, the source system 202 may be a relational database such as Oracle, Sybase, MySQL, PostgreSQL, SQLite3, and/or the like. In alternate embodiments, the source system 202 may be a non-relational database such as MongoDB, DocumentDB, Cassandra, Coachbase, HBase, Redis, Neo4j, and/or the like. In some other embodiments, the source system 202 may be a Hadoop Distributed File System (HDFS). In some embodiments, the destination system 204 may be a database system. In some embodiments, the destination system 204 may be a relational database such as Oracle, Sybase, MySQL, PostgreSQL, SQLite3, and/or the like. In alternate embodiments, the destination system 204 may be a non-relational database such as MongoDB, DocumentDB, Cassandra, Coachbase, HBase, Redis, Neo4j, and/or the like. In some other embodiments, the destination system 204 may be a Hadoop Distributed File System (HDFS).

In some embodiments, the source system 202 and the destination system 204 may be heterogeneous systems. For example, the source system 202 may be an Oracle database and the destination system may be a MySQL database. In another example, the source system 202 may be a MySQL database and the destination system 204 may be MongoDB. In yet another example, the source system 202 may be an Oracle database and the destination system may be a Hadoop Distributed File System (HDFS).

The systems and devices communicate with one another over the network 150 and perform one or more of the various steps and/or methods according to embodiments of the disclosure discussed herein. In one embodiment, the network 150 includes internet 151, a wireless telephone network 152, and/or the like. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

Referring now to FIG. 2, the figure illustrates a block diagram of the automated partitioning and synchronization system 200, in greater detail, in accordance with embodiments of the invention. As illustrated in FIG. 2, in one embodiment of the invention, automated partitioning and synchronization system 200 includes one or more processing devices 220 operatively coupled to a network communication interface 210 and a memory device 240. In some embodiments, the automated partitioning and synchronization system 200 is operated by an entity, such as a financial institution.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 240 includes any computer memory that provides an actual or virtual space to temporarily or permanently store data and/or commands provided to the processing device 220 when it carries out its functions described herein. In one embodiment of the invention, the memory device 240 comprises partitioning application 250, synchronization application 260, migration application 270, archival application 280, monitoring application 290, and/or the like. In some embodiments, the memory device 240 may also include a job scheduler (not shown), wherein the job scheduler is used to schedule the The applications 250, 260, 270, 280, and 290 are for instructing the processing device 220 to perform various steps of the methods discussed herein, and/or other steps and/or similar steps. In various embodiments, one or more of the applications 250, 260, 270, 280, and 290 are included in the computer readable instructions stored in a memory device of one or more systems or devices other than the system 200. In various embodiments, the applications 250, 260, 270, 280, and 290 stored and executed by different systems/devices are different. In some embodiments, the applications 250, 260, 270, 280, and 290 stored and executed by different systems may be similar and may be configured to communicate with one another, and in some embodiments, the applications 250, 260, 270, 280, and 290 may be considered to be working together as a singular application despite being stored and executed on different systems. In some embodiments, the source system 202 and the destination system 204 may include one or more processing devices operatively coupled to a network communication interface and a memory device, wherein the memory device may include one or more applications to perform or facilitate various steps of the methods discussed herein, and/or other steps and/or similar steps.

Now referring to FIG. 3A and FIG. 3B, the figure illustrates a process flow 300 for archiving, partitioning, and synchronizing heterogeneous data systems, in accordance with embodiments of the invention. As shown in block 305, the automated archival partitioning and synchronization system 200 identifies triggering of an event, wherein the event comprises performance degradation of a source system below a defined value. In some embodiments, the defined value may be set by an administrator or a user. In some other embodiments, the defined value is assigned by the system 200 automatically. For example, the source system 202 receives data on a daily basis which occupies 1.5% of the memory of the source system 202. The source system 202 performs efficiently when more than 50% of the memory is available and therefore the archival process is performed for every 30 days. In some instances, the source system may receive high amount of data which may occupy more than 50% of the memory, thereby degrading the performance of the source system 202. When the source system performance falls below the defined value, the source system 202 initiates a trigger which is identified by the archival partitioning and synchronization system 200. In some embodiments, the event may be any defined restriction based on other requirements. In some embodiments, the system 200 identifies a control signal from a job scheduler as the event to initiate archival process, wherein the job scheduler is an application stored in the system 200 for controlling the process of archival, partitioning, and synchronization of data. The job scheduler includes one or more parameters to define a time interval to perform the process of archival. For example, an administrator or a user may set up the job scheduler to perform the process of archival for every 30 days or on the last day of every month. In some embodiments, the system 200 identifies the control signal from a manual run executed by a user or an administrator as the event to initiate the archival process. For example, a user receives an instruction according to a business requirement and initiates the process flow of archival by performing a manual run.

As shown in block 310, the system 200 establishes a communication link with the source system 202 and a destination system 204 based on identifying the triggering of the event, wherein the source system 202 and the destination system are heterogeneous systems. In some embodiments, the system 200 establishes the communication link based on identifying the control signal generated by the job scheduler or by identifying the control signal from the manual run executed by the user.

As shown in block 315, the system 200 determines if the event meets archival criteria. For example, when the system 200 identifies the event as performance degradation of the source system below the defined value, the performance degradation of a system may occur due to various factors. Therefore, the system 200 determines if the occupied disk space of the source system is greater than or less than a threshold value, wherein the occupied disk space being greater than or equal to the threshold value is defined as the archival criteria. In some embodiments, the archival criteria may be defined as determining if the source system is unstable. In some embodiments, the archival criteria is defined by the user. In some embodiments, the archival criteria is automatically assigned by the system 200 based on determining type of the event. When the event meets the archival criteria the process flow advances to block 320. For example, when the system 200 determines that the occupied disk space is greater than 60%, the process flow proceeds to block 320. In some embodiments, the system 200 determines that the event does not meet archival criteria and the process flow reverts to block 305. For example, when the occupied disk space of the source system is below 60% after identifying that the performance of the source system 202 has degraded below the defined value, the system 200 reverts back to block 305.

As shown in block 320, the system 200 initiates the archival process. In some embodiments, the archival process includes partitioning and sub partitioning of data in the source system, synchronizing the configuration of the source system and the destination system, data migration from source system to the destination system, and/or the like. As shown in block 325, the system 200 performs partitioning and sub-partitioning of a first set of data stored in the source system based on a set of rules, wherein partitioning and sub-partitioning of the first set of data stored in the source system increases performance and manageability and also aids load balancing. The set of rules may be defined standards as per requirements, user preferences, and/or the like. In some embodiments, the system 200 performs partitioning of the first set of data based on preferences set by the user. In an exemplary embodiment, the first set of data may be a group of transactional data and the first set of data may be partitioned by grouping the data based on months and the partitioned data may be sub-partitioned based on account numbers. The system 200 identifies a group of transactions performed in the month of January and partitions the first set of data for the month of January. The system 200 sub-partitions the partitioned data based on account numbers by identifying multiple groups of transactions from the group of transactions associated with multiple account numbers. Partitioning and sub-partitioning of data reduces the time required to process a request and also reduces the time required to perform maintenance operations. Partitioning of the first set of data stored in the source system may be range partitioning, list partitioning, composite partitioning, hash partitioning, and/or the like. In some embodiments, the partitioning may be horizontal partitioning. In some other embodiments, the partitioning may be vertical partitioning.

As shown in block 330, the system 200 compares a first configuration of the source system with a second configuration of the destination system to identify any modifications to the first configuration of the source system. The system 200 identifies any modifications made to the first configuration of the source system by comparing the first configuration of the source system with the second configuration of the destination system, wherein the second configuration is the last restored configuration of the source system. In some embodiments, the system 200 identifies the modifications by comparing first metadata from a first metadata table provided by the source system with a second metadata from a second metadata table provided by the destination system. For example, when the source system is Oracle database system and destination is MySQL database system, the oracle database system creates the first metadata table comprising first metadata and the MySQL database system creates the second metadata table comprising second metadata. The system 200 compares the first metadata table with the second metadata table.

Next, as shown in block 335, the system 200 determines if the first configuration matches the second configuration. If the first configuration does not match the second configuration, the process flow proceeds to block 340 and when the first configuration matches the second configuration, the system 200 proceeds to block 345. In some embodiments, the system 200 identifies addition of new columns to the source system by comparing the first configuration with the second configuration. For example, the source system may initially have 3 columns with different datatypes and the destination system archives the data of the source system at time period T1. A new source column may be added to the source system as per requirements in between time period T1 and time period T2, wherein the time periods T1, T2, T3 . . . TN are regular intervals at which the data of the source system is archived. However, at time period T2 when the system 200 initiates the process of archival, the destination system will have 3 columns and the source system will have 4 columns, thereby creating a mismatch in the configurations of the source system and the destination system. The system 200 identifies the mismatch in the configurations of the source system and the destination system. In some embodiments, the time period may be set to 30 days . In some embodiments, the time period may be set to every last Sunday of the month.

In some embodiments, the system 200 identifies changes to the existing columns of the source system. For example, the source system may be an Oracle database system and may initially have 3 columns with "char", "nchar", and "date" datatypes at time period T1. The destination system may be a MySQL database system having 3 columns at time period T1 with corresponding datatypes ("char", "varchar", "date") (illustrated in FIG. 5) to match the datatypes of the source system. The third column of the source system with "date" datatype may be changed to "timestamp" datatype as per business requirements between time period T1 and time period T2. However, at time period T2 when the system 200 initiates the process of archival, the destination system will have 3 columns with "char", "varchar", "date" datatypes and the source system will have 3 columns with "char", "nchar", "timestamp" datatypes, thereby creating a mismatch in the configurations of the source system and the destination system. The system 200 identifies mismatch in the column definitions of the source system and the destination system. In another exemplary embodiment, the source system may be an Oracle database system having 3 columns with "char", "date", and "clob" datatypes at time period T1. The destination system may be a Hadoop Distributed File System having 3 columns with "char", "date", "varchar" datatypes corresponding to the datatypes in the source system. The third column of the source table with "clob" datatype may be changed to "timestamp" datatype according to business requirements between time period T1 and time period T2. However, at time period T2 when the system 200 initiates the process of archival, the destination system will have 3 columns with "char", "date", and "varchar" datatypes and the source table will have 3 columns with "char", "date", and "timestamp" datatypes, thereby creating a mismatch in the configurations of the source table and the destination table. The system 200 identifies mismatch in the column definitions of the source table and the destination table. In another exemplary embodiment, both the source system and the destination system may be Oracle database systems and may have 3 columns with "char", "date", and "clob" datatypes at time period T1. The third column of the source table with "clob" datatype may be changed to "varchar" according to business requirements between time period T1 and time period T2. However, at time period T2 when the system 200 initiates the process of archival, the destination system will have 3 columns with "char", "date", and "clob" datatypes and the source table will have 3 columns with "char", "date", and "varchar" datatypes, thereby creating a mismatch in the configurations of the source table and the destination table. The system 200 identifies mismatch in the column definitions of the source table and the destination table.

As shown in block 340, the system 200 automatically synchronizes the second configuration to match the first configuration based on determining that the first configuration does not match the second configuration. As discussed above, wherein the source system has 4 columns and the destination system has 3 columns at time period T2, the system 200 synchronizes the first configuration of the source system and the second configuration of the destination system by creating a new destination column in the destination system and assigning a datatype corresponding to the datatype of the new source column in the source system. For example, the source system is an Oracle database system and the destination is MySQL database system and when the new source column is introduced in the Oracle database system with datatype "number", the system 200 creates the new destination column in the MySQL database system with datatype "integer" to synchronize the first configuration of the Oracle database system and the second configuration of the MySQL database system. In some embodiments, the system 200 assigns the value of "zero" to the rows under the new destination column.

In some embodiments, the destination system is not configured. For example, the destination system is a new system without any prior versions of the source system saved in the destination system. In such an embodiment, the system 200 creates columns and assigns datatypes to replicate the first configuration.

As shown in block 345, the system 200 compares the first set of data in the source system with a second set of data in the destination system to detect any modifications to the data. In some embodiments, as shown in block 350, the system 200 determines if the first set of data matches the second set of data based on comparing the first set of data with the second set of data. When the first set of data matches the second set of data the process flow proceeds to block 365, wherein the system 200 truncates the communication link and when the first set of data does not match the second set of data, the process flow proceeds to block 355.

As shown in block 355, the system 200 migrates the first set of data from the source system to update the second set of data in the destination system based on determining that the first set of data does not match the second set of data. As discussed in the above example, wherein the source system has 4 columns and the destination system has 3 columns at time period T2, the system 200 synchronizes the first configuration of the source system and the second configuration of the destination system by creating a new destination column in the destination system and assigning a datatype corresponding to the datatype of the new source column in the source system. The system migrates the first set of data to update the second set of data in the destination system, thereby including the new source column data in the new destination column of the destination system. In some embodiments, the system 200 upon determining that the first set of data does not match the second set of data, migrates all columns and rows of the first set of data. In some other embodiments, the system the system 200 upon determining that the first set of data does not match the second set of data, migrates only the data in the those cells of the first set of data which do not match the second set of data. For example, a new source column has been added to the source system and upon determining that the first set of data does not match the second set of data, the system 200 migrates only the data in the new source column of the source system to the destination system.

Next as shown in block 360, the system 200 determines if the migration is successful. Upon successful migration, the system 200 truncates the communication link as shown in block 365. As shown in block 370, the system 200 compresses the migrated data in the destination system, wherein the migrated data is the updated second set of data and updates indexes associated with the updated second set of data in the destination system. In some embodiments, the system 200 compresses the updated second set of data and stores the compressed second set of data in another location within the memory of the destination system. In some embodiments, if the migration fails, the system 200 creates a record in a log system as disclosed in block 375. In some embodiments, the system 200 initiates the migration process after a defined time interval after creating the record in the log system. In some other embodiments, an administrator initiates the migration process based on the record in the log system. The system 200 also creates another record in the log system indicating the successful compression of the second set of data, thereby completing the process of archival.

Now referring to FIG. 4, the figure illustrates a user interface 400 for archival partitioning and synchronizing heterogeneous data systems, in accordance with embodiments of the invention. The user interface includes the source system 202 and the destination system 204 wherein the user can select the type of system, schema, and table name of both the source system 202 and the destination system 204. FIG. 4 illustrates the user selection of data system 1 with schema 1 as the source system and data system 2 with schema 2 as the destination system. For example, data system 1 may be an Oracle database system with schema 1 and data system 2 may be a MySQL database system with schema 2, wherein data system 1 and data system 2 have 2 tables (table name 1 and table name 2.) FIG. 4 also illustrates the user selection of data system 2 with schema 2 as the source system and data system 1 with schema 1 as the destination system. FIG. 4 further illustrates the user selection of data system 1 with schema 1 as the source system and data system 3 with no schema as the destination system. For example, data system 1 is an Oracle database system with schema 1 and data system 3 may be a Hadoop Distributed File System (HDFS) with no schema, wherein data system 1 and data system 3 have 2 tables (table name 1 and table name 2.)

FIG. 5 represents configuration mapping table 500 wherein the columns represent different database systems and the rows represent different datatypes available in the database associated with that column. The data systems defined below may be any type of available data systems and are not limited to the data systems and data types described in the example below. In one exemplary embodiment, "Column 1" may be an Oracle database system (data system 1) having "char" (datatype 1A), "nchar" (datatype 1B), "varchar" (datatype 1C), "raw" (datatype 1D), "longraw" (datatype 1E), "timestamp" (datatype 1F), and "clob" (datatype 1G) datatypes corresponding to the datatypes in other columns. "Column 2" may be a SQL SERVER database system with datatypes "char" (datatype 2A), "nchar" (datatype 2B), "varchar" (datatype 2C), "text" (datatype 2D), "text" (datatype 2E), "datetime" (datatype 2F), and "text" (datatype 2G) corresponding to the datatypes in other columns. "Column 3" may be a MySQL database system with datatypes "char" (datatype 3A), "varchar" (datatype 3B), "varchar" (datatype 3C), "longtext" (datatype 3D), "long text" (datatype 3E), "datetime" (datatype 3F), and "longtext" (datatype 3G) corresponding to the datatypes in other columns. "Column 4" may be a Hadoop Distributed File System (HDFS) with datatypes "char" (datatype 4A), "varchar" (datatype 4B), "varchar" (datatype 4C), "varchar" (datatype 4D), "varchar" (datatype 4E), "timestamp" (datatype 4F), and "varchar" (datatype 4G) corresponding to the datatypes in other columns. The system 200 uses the configuration mapping table to synchronize configurations of the source system and the destination system. The datatype 1A in "Column 1" is datatype 2A in "Column 2", datatype 3A in "Column 3", and datatype 4A in "Column 4". In the exemplary embodiment defined above, the datatype "timestamp" in Oracle database system is "datetime" in SQL SERVER database system, "datetime" in MySQL database system, and "timestamp" in Hadoop Distributed File System. The datatype "raw" in Oracle database system is "text" in SQL SERVER database system, "longtext" in MySQL database system, and "varchar" in Hadoop Distributed File System.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices described herein. For example, a portion of one or more applications may be stored on the user device, or may be included as a portion of financial institution applications, such as an online entity application, in order to achieve embodiments of the inventions described herein.

It should be understood, that the systems and devices described in FIG. 1, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications and devices that the system(s) utilize as data sources. The information received from monitoring may be provided via wireless network path portions through the Internet. When the systems or devices are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices, the system may be configured to provide target information to the user and/or allow the user to make changes to or control the applications and/or devices.

Moreover, it should be understood that the process flows described herein include transforming the information sent and/or received from the applications of the different systems (e.g., internally or externally) and/or the devices from one or more data formats into a data format associated with an application for display to the user on the user device. There are many ways in which information is converted within the system environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for automated archival, partitioning, and synchronization on heterogeneous data systems, the system comprising:
    a computer apparatus including at least one processor and at least one memory; and
    an automated archival partitioning and synchronization application stored in a memory, comprising executable instructions that when executed by the one or more processors cause the processor to:
    identify triggering of an event, wherein the event comprises performance degradation of a source system below a defined value;
    establish a communication link with the source system and a destination system based on identifying the triggering of the event, wherein the source system and destination system are heterogeneous data systems;
    determine that the event meets one or more archival criteria;
    in response to determining that the event meets the one or more archival criteria, initiate archival process, wherein the archival process comprises:
        comparing a first configuration of the source system with a second configuration of the destination system and determining that the first configuration does not match the second configuration by performing at least one of:
            determining that a first number of columns associated with the source system does not match a second number of columns associated with the destination system; and
            determining that a source column data type associated with each of source columns does not match a destination column data type associated with each of the corresponding destination columns, wherein the source column data type and the destination column data type are datatypes associated with the heterogeneous data systems;
        synchronizing the second configuration with the first configuration based on determining that the first configuration does not match the second configuration by performing at least one of:
            creating at least one new column in the destination system to match the first number of columns in the source system and assigning a new destination column data type to the at least one new column to match the corresponding source column data type of a new source column corresponding to the at least one new column;
            deleting one or more columns in the destination system to match the first number of columns in the source system; and
            modifying the destination column data type associated with at least one of the destination columns to match the source column data type associated with the corresponding source columns;
        identifying a change in a first set of data stored in the source system based on comparing the first set of data with a second set of data stored in the destination system;
        migrating the first set of data from the source system to update the second set of data in the destination system;

determine that the migration of the first set of data to the destination system is successful and truncate the communication link; and compress the updated second set of data in the destination system and update indexes associated with the destination system.

2. The system of claim 1, wherein the automated archival partitioning and synchronization application stored in the memory, comprising executable instructions that when executed by the one or more processors cause the processor to implement the archival process, wherein the archival process further comprises partitioning and sub-partitioning of the first set of data stored in the source system, wherein the partitioning and sub-partitioning of the first set of data is based on a set of rules.

3. The system of claim 1, wherein synchronizing the first configuration with the second configuration comprises mapping datatypes of the source system and the destination system.

4. The system of claim 1, wherein the communication link between the source system and the destination system is established based on receiving a command at least from one of a job scheduler or a manual run.

5. The system of claim 1, wherein the automated archival partitioning and synchronization application stored in the memory, comprising executable instructions that when executed by the one or more processors cause the processor to implement the archival process, wherein the archival process further comprises:

comparing a first configuration of the source system with a second configuration of the destination system and determining that the first configuration matches the second configuration;

identifying a change in a first set of data stored in the source system based on comparing the first set of data with a second set of data stored in the destination system; and migrating the first set of data from the source system to update the second set of data in the destination system.

6. The system of claim 1, wherein the determining that the migration of the first set of data to the destination system is successful further comprises creating a record in a log system.

7. A computer program product comprising computer program code stored on a non-transitory computer-readable medium which is readable by a computer, said computer program product is used for automated archival, partitioning, and synchronization on heterogeneous data systems, said computer program code comprising computer instructions to cause one or more computer processors to perform the operations of:

identifying triggering of an event, wherein the event comprises performance degradation of a source system below a defined value;

establishing a communication link with the source system and a destination system based on identifying the triggering of the event, wherein the source system and destination system are heterogeneous data systems;

determining that the event meets one or more archival criteria;

in response to determining that the event meets the one or more archival criteria, initiating archival process, wherein the archival process comprises:

comparing a first configuration of the source system with a second configuration of the destination system and determining that the first configuration does not match the second configuration by performing at least one of:

determining that a first number of columns associated with the source system does not match a second number of columns associated with the destination system; and determining that a source column data type associated with each of source columns does not match a destination column data type associated with each of the corresponding destination columns, wherein the source column data type and the destination column data type are datatypes associated with the heterogeneous data systems;

synchronizing the second configuration with the first configuration based on determining that the first configuration does not match the second configuration by performing at least one of:

creating at least one new column in the destination system to match the first number of columns in the source system and assigning a new destination column data type to the at least one new column to match the corresponding source column data type of a new source column corresponding to the at least one new column;

deleting one or more columns in the destination system to match the first number of columns in the source system; and modifying the destination column data type associated with at least one of the destination columns to match the source column data type associated with the corresponding source columns;

identifying a change in a first set of data stored in the source system based on comparing the first set of data with a second set of data stored in the destination system;

migrating the first set of data from the source system to update the second set of data in the destination system;

determining that the migration of the first set of data to the destination system is successful and truncate the communication link; and compressing the updated second set of data in the destination system and update indexes associated with the destination system.

8. The computer program product of claim 7, wherein said computer program code comprising computer instructions to cause one or more computer processors to perform the operations of the archival process, wherein the archival process further comprises partitioning and sub-partitioning of the first set of data stored in the source system, wherein the partitioning and sub-partitioning of the first set of data is based on a set of rules.

9. The computer program product of claim 7, wherein synchronizing the first configuration with the second configuration comprises mapping datatypes of the source system and the destination system.

10. The computer program product of claim 7, wherein the communication link between the source system and the destination system is established based on receiving a command at least from one of a job scheduler or a manual run.

11. The computer program product of claim 7, wherein said computer program code comprising computer instructions to cause one or more computer processors to perform the operations of the archival process, wherein the archival process further comprises:

comparing a first configuration of the source system with a second configuration of the destination system and determining that the first configuration matches the second configuration;

identifying a change in a first set of data stored in the source system based on comparing the first set of data with a second set of data stored in the destination system; and migrating the first set of data from the source system to update the second set of data in the destination system.

12. The computer program product of claim 7, the determining that the migration of the first set of data to the destination system is successful further comprises creating a record in a log system.

13. A computer implemented method for automated archival, partitioning, and synchronization on heterogeneous data systems, the method comprising:

identifying triggering of an event, wherein the event comprises performance degradation of a source system below a defined value;

establishing a communication link with the source system and a destination system based on identifying the triggering of the event, wherein the source system and destination system are heterogeneous data systems;

determining that the event meets one or more archival criteria;

in response to determining that the event meets the one or more archival criteria, initiating archival process, wherein the archival process comprises:

comparing a first configuration of the source system with a second configuration of the destination system and determining that the first configuration does not match the second configuration by performing at least one of:

determining that a first number of columns associated with the source system does not match a second number of columns associated with the destination system; and determining that a source column data type associated with each of source columns does not match a destination column data type associated with each of the corresponding destination columns, wherein the source column data type and the destination column data type are datatypes associated with the heterogeneous data systems;

synchronizing the second configuration with the first configuration based on determining that the first configuration does not match the second configuration by performing at least one of:

creating at least one new column in the destination system to match the first number of columns in the source system and assigning a new destination column data type to the at least one new column to match the corresponding source column data type of a new source column corresponding to the at least one new column;

deleting one or more columns in the destination system to match the first number of columns in the source system; and modifying the destination column data type associated with at least one of the destination columns to match the source column data type associated with the corresponding source columns;

identifying a change in a first set of data stored in the source system based on comparing the first set of data with a second set of data stored in the destination system;

migrating the first set of data from the source system to update the second set of data in the destination system;

determining that the migration of the first set of data to the destination system is successful and truncate the communication link; and compressing the updated second set of data in the destination system and update indexes associated with the destination system.

14. The computer implemented method of claim 13, wherein the archival process further comprises partitioning and sub-partitioning of the first set of data stored in the source system, wherein the partitioning and sub-partitioning of the first set of data is based on a set of rules.

15. The computer implemented method of claim 13, wherein synchronizing the first configuration with the second configuration comprises mapping datatypes of the source system and the destination system.

16. The computer implemented method of claim 13, wherein the communication link between the source system and the destination system is established based on receiving a command at least from one of a job scheduler or a manual run.

17. The computer implemented method of claim 13, wherein the archival process further comprises:

comparing a first configuration of the source system with a second configuration of the destination system and determining that the first configuration matches the second configuration;

identifying a change in a first set of data stored in the source system based on comparing the first set of data with a second set of data stored in the destination system; and migrating the first set of data from the source system to update the second set of data in the destination system.

18. The computer implemented method of claim 13, wherein the determining that the migration of the first set of data to the destination system is successful further comprises creating a record in a log system.

* * * * *